Oct. 29, 1968          L. WICHINSKY          3,407,754
DOUGH KNEADING MACHINE FOR THE FORMING OF A
BAGEL AND THE LIKE
Filed March 8, 1966
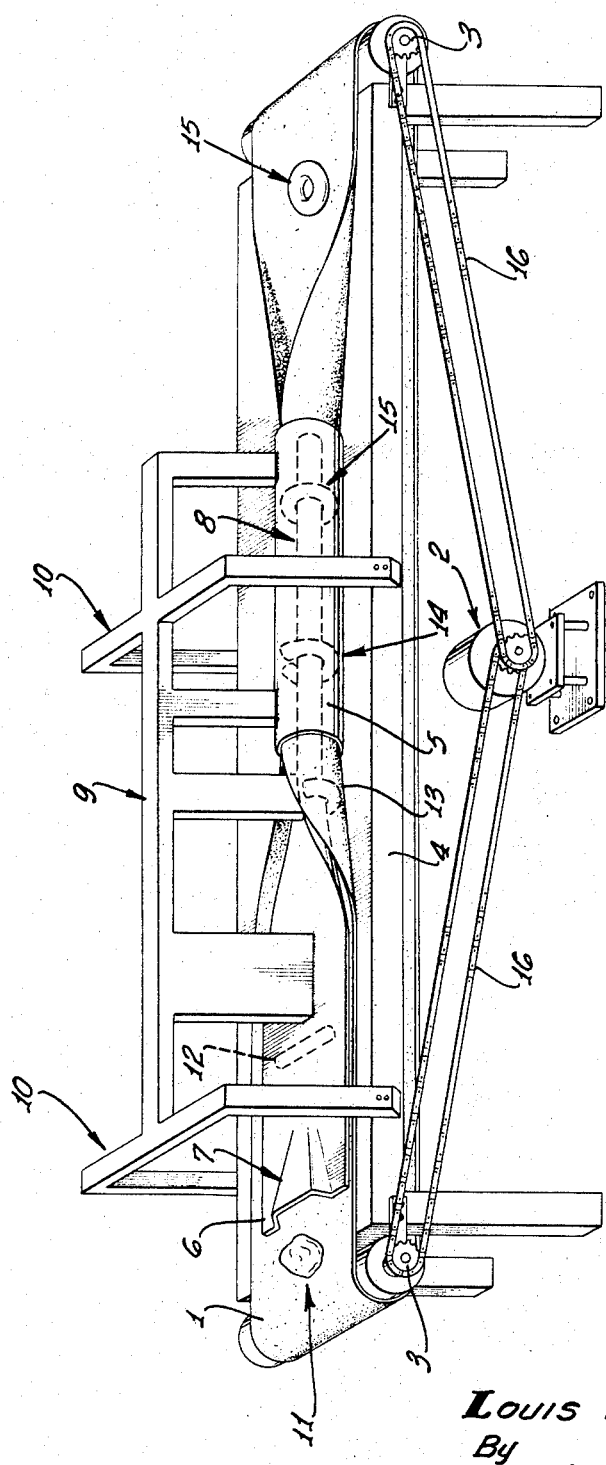
INVENTOR.
LOUIS WICHINSKY
By
Miketta, Glenny, Poms & Smith
ATTORNEYS.

3,407,754
DOUGH KNEADING MACHINE FOR THE FORMING OF A BAGEL AND THE LIKE
Louis Wichinsky, Hurleyville, N.Y. 12747
Filed Mar. 8, 1966, Ser. No. 532,798
3 Claims. (Cl. 107—8)

ABSTRACT OF THE DISCLOSURE

A dough forming machine for the formation of toroidal dough shapes for the making of bagels, or the like, from an irregular mass of dough.

---

This invention is a comparatively simple machine to knead dough into a shape commonly called a bagel or similarly shaped masses of dough.

This invention is one of which because of its simplicity, will enable most bakeries interested in this type of product to be able to use and own their own machine at a minimum of expense.

This invention because of its simplicity and because of its low cost will thusly allow the prohibitive cost of a bagel to so many, to be then lowered and in reach of all.

This invention because of its features will do the job of a skilled few in certain areas and allow everyone who wishes, to realize the benefits of this product.

In the accompanying drawing a perspective view of the apparatus is shown to explain the component parts, their action and the purpose they serve.

This invention utilizes the continuous action of a conveyor belt 1 which is put into motion by a motor 2 which is linked by a drive chain 16 to rollers 3.

These parts are placed into operating position on a good, sturdy frame 4. The size, length and width are determined by the length and width of the conveyor belt 1.

A portion of conveyor belt 1 is enveloped by a tube 5 which acts as a housing to force a section of the belt to assume a circular cross-section defined by the tube 5.

A kneading plate 6 is fashioned in such a manner by where it follows the contour of the belt as it enters tube 5.

The length of this kneading plate 6 is proportioned to the size of the belt 1 all of which is determined by how large an area must be had to form the finest product with a minimum of equipment.

An entry 7 which may have a trapezoidal cross-sectional shape in the forward edge thereof which fairs into the flat surface of the kneading plate 6 aids in centering the dough for the best operation.

Extending rearwardly in the direction of translatory motion of the conveyor belt past this kneading plate 6 and affixed to its rearward end just prior to entry into the tube 5 is a cylindrical shaft or mandrel 8 which extends axially through the tube 5 and ends at the outer end of tube 5. Kneading plate 6 and shaft 8 are secured together. This assembly is then held in proper position by one vertical leg of bracket 9 supported by legs fastened to frame 4. Besides the one vertical leg connected to the kneading plate at the region in which the transition from flat to cylindrical occurs, a second vertical leg is connected to the flat portion of kneading plate 6, and two vertical legs support the tube 5.

Now the machine can be put into operation for the belt 1 will travel through the tube 5 and tube 5 will remain stationary.

Thereupon a piece of dough 11 is placed on a conveyor belt 1; it is carried into entry 7, thereupon a kneading process goes into action.

The kneading plate 6 and conveyor belt 1 are vertically spaced apart a predetermined distance. An irregularly shaped piece of dough 11 carried by the conveyor belt 1 will be shaped between the surface of the belt and the kneading plate into a longitudinally extending cylindrical shaped piece of dough, as illustrated in the drawing at 12. As the cylinder of dough 12 proceeds toward the tube 5, it rotates about its own axis and simultaneously begins to assume the cross-sectional shape defined by the conveyor belt 1. As the dough 12 passes into the section of the conveyor belt which is formed into a circle, the distance between the belt and the mandrel 8 diminishes so that the length of the dough cylinder is extended whereupon the two ends of the cylinder approach one another, as shown at 14. The end portions of the dough 14 then overlap, and are kneaded by the rotation of the dough about its own toroidal axis between the mandrel 8 and the now cylindrically formed section of the conveyor belt 1 so as to form a completed bagel 15. The finished bagel is then discharged onto the flat surface of the belt 1 and carried forward to a receptacle or is removed therefrom.

This feature is accomplished for the rolling action of the dough strip 12 allows the dough 13 to expand around the inner oval of belt 1 against the shaft 8. Thereupon any spacing between the dough 14 is at the point of closing or has been closed.

Thusly the dough has now taken on the feature of a partially formed bagel and before it is completely rolled over shaft 8 it now becomes bagel 15. Upon discharge from end shaft it is surfaced on belt 1 and a nice bagel 15 is brought into view.

What is claimed is:
1. In a machine for forming rings of dough comprising a frame, an endless flexible conveyor supported by said frame, said conveyor operated to carry discrete pieces of dough along a translatory path, means for driving said conveyor, means supported by said frame to cause said conveyor to gradually assume a substantially circular cross-sectional form and subsequently gradually resume a flat position, a mandrel supported centrally above the conveyor and extending axially into the cylindrically shaped portion of the conveyor, the provision of:

kneading means supported centrally above the conveyor for forming an irregularly shaped piece of dough moved by the conveyor into a cylindrical strip of dough prior to the passing of the dough into the cylindrical shaped portion of the conveyor so as to produce an endless dough ring of circular cross-section.

2. The device of claim 1 wherein said kneading means comprises a plate having a substantially flat forward portion which gradually assumes a cylindrical cross-section at the rearward end thereof, said rearward end being adjacent to the forward end of said mandrel.

3. The device of claim 1 wherein said means for kneading the dough comprises a plate having an entry portion with an initial trapezoidal cross-section which diminishes in size in a longitudinal direction, a central flat portion, and a rearward portion having a cross-section which gradually changes from flat to cylindrical, the cylindrical rearward end of the rearward portion connected to the mandrel.

References Cited
UNITED STATES PATENTS
2,666,398   1/1954   Gendler et al. _____ 107—8 X WALTER A. SCHEEL, *Primary Examiner.*

J. SHEA, *Assistant Examiner.*